(No Model.)
J. S. SMITH.
PROCESS OF AND APPARATUS FOR DEHYDRATING GAS.
No. 580,147. Patented Apr. 6, 1897.
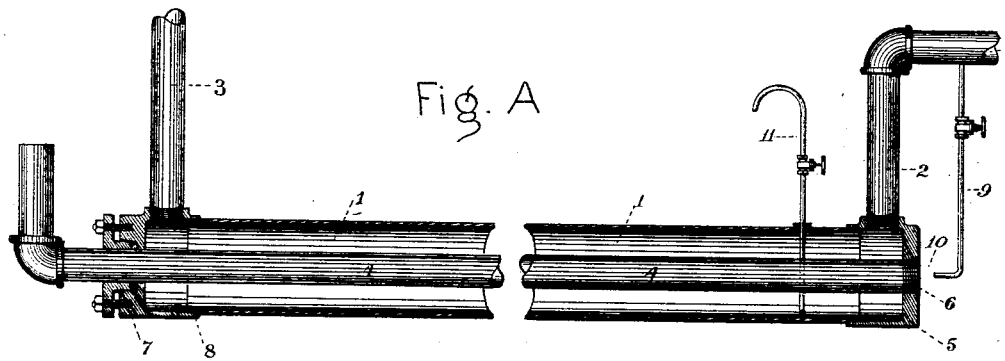
Fig. A
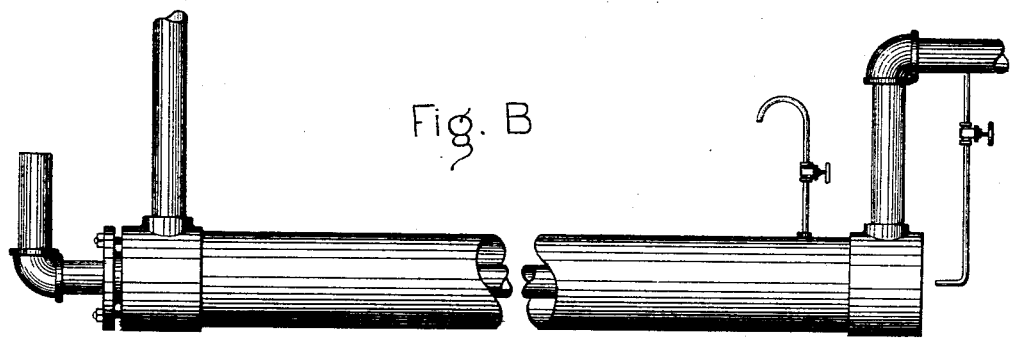
Fig. B

UNITED STATES PATENT OFFICE.

JACOB S. SMITH, OF CHICAGO, ILLINOIS.

PROCESS OF AND APPARATUS FOR DEHYDRATING GAS.

SPECIFICATION forming part of Letters Patent No. 580,147, dated April 6, 1897.

Application filed July 9, 1896. Serial No. 598,607. (No model.)

*To all whom it may concern:*

Be it known that I, JACOB S. SMITH, a citizen of the United States, residing at the city of Chicago, in the county of Cook and State of Illinois, have invented a new and useful Dehydrating-Machine, of which the following is a specification.

My invention consists in a machine for dehydrating gas by the removal of the moisture therefrom, thus preventing precipitation and freezing in the mains. The machine comprises a pipe or reservoir into which the gas is introduced, the reservoir being subjected to a temperature considerably below that of the gas, the water and other vapor being thus frozen or precipitated within the reservoir. Within the reservoir is a pipe or radiator through which is passed heated air to liquefy the condensation, the liquid thus formed being forced form the reservoir through a pipe by the pressure of the gas entering the reservoir.

When natural gas flows from a well, it is saturated with an amount of aqueous vapor due to its temperature. This temperature averages about 55° Fahrenheit, and if the temperature of the gas be reduced below that point a certain proportion of the total amount of vapor contained in the gas will be deposited in the form of water, and if the temperature be reduced sufficiently the precipitation will take the form of frost or ice. Thus if the pipe or reservoir containing the gas be cooled to the freezing-point, or 32° Fahrenheit, the greater portion of the water carried by the gas will be deposited as water and may be drawn off. If the gas be cooled below 32°, the deposit will take the form of frost or ice and may then be heated to form a liquid which may be drawn off as before.

It is the object of the present invention to take advantage of this law, and in accordance therewith the gas is passed through a pipe or reservoir subjected to a temperature lower than the initial temperature of the gas either by exposure of the reservoir to the atmosphere, to water, or to expanding ammonia or other gas. In long pipe-lines the reservoirs may be placed at intervals and located in the ground and above the frost-line. The temperature of the gas is thus reduced to such an extent that a large proportion of the suspended vapor will be precipitated in the form of water or frost, depending on the temperature of the atmosphere. When in the form of frost or ice, the deposit may be melted, preferably, by passing heated air through a pipe situated on the interior of the reservoir, the water being then forced from the reservoir by the pressure of the gas.

In the operation of the dehydrater after a considerable deposit of frost and ice has accumulated the flow of gas through the reservoir is stopped and the heated air is passed through the interior pipe or radiator to melt the deposit, after which the gas is turned on again to force the liquid through a duct-opening near the bottom of the reservoir.

I have illustrated the machine in the accompanying drawings, in which—

Figure A is a sectional view of the dehydrater. Fig. B is a view thereof in elevation.

Similar numbers refer to similar parts in both views.

The gas passes through the reservoir 1, through the pipe 2, and is discharged through the pipe 3. Within the reservoir is a pipe 4, tightly secured within the reservoir by means of the cap 5, into which the threaded end 6 of the pipe screws, and at the opposite end by means of the stuffing-box 7, screwed upon the threaded end 8 of the reservoir. The pipe 4 forms a radiator within the reservoir, a flame being projected from the supply-pipe 9 into the mouth 10 of the inner pipe or radiator 4. A pipe 11 is inserted into the reservoir and extends to the lowest point of the reservoir 1. The reservoir 1 is slightly inclined to cause the liquid to flow toward the mouth of the pipe 11. The gas passes by pipe 2 into the reservoir 1, and being thus subjected to the low temperature the moisture freezes and congeals upon the pipe 4 and on the walls of reservoir 1. The heat from the radiator 4 melts the precipitation thus formed and the pressure of the gas forces the liquid through the pipe 11.

Having described my invention, what I claim as new, and desire to secure by Letters Patent, is—

1. The combination with a reservoir through which the gas is passed, the walls of said reservoir being adapted to be subjected to a temperature below that of the gas to congeal the moisture in the gas, a radiator upon the interior of said reservoir to melt the congealed mass and an exit-pipe for the liquid opening near the bottom of the reservoir to effect the forcing of the liquid from the reservoir by the pressure of the gas, substantially as described.

2. The herein-described method of dehydrating gas, which consists in passing the gas through a receptacle wherein it is subjected to a low temperature to congeal the moisture, subsequently subjecting the congealed mass to a melting temperature, and then forcing the liquid from the receptacle by the pressure of the gas, substantially as described.

3. The combination with the pipe or reservoir 1 occupying an inclined position, of the inlet and outlet pipes 2 and 3, the exit-pipe 11 opening into the reservoir near the bottom of the lower end thereof, a pipe or radiator 4 extending longitudinally through the pipe 1, and a gas-supply pipe 9 for directing a flame into said radiator, substantially as described.

JACOB S. SMITH.

Witnesses:
CHAS. E. SPAAK,
F. P. LEONARD.